INVENTOR
Richard J. Rowekamp

Oct. 31, 1967  R. J. ROWEKAMP  3,349,573
SOLAR FREEZING METHOD FOR DESALTING SEA WATER
Filed Oct. 23, 1965  2 Sheets-Sheet 2
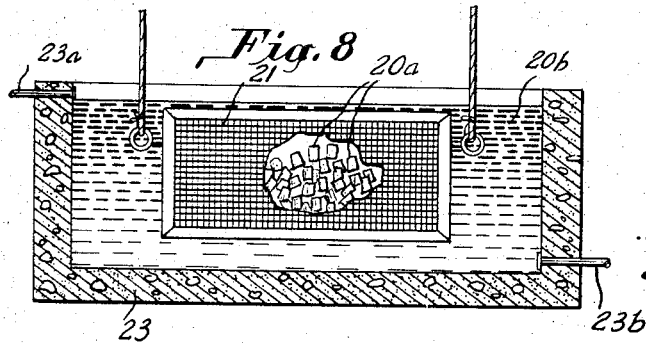
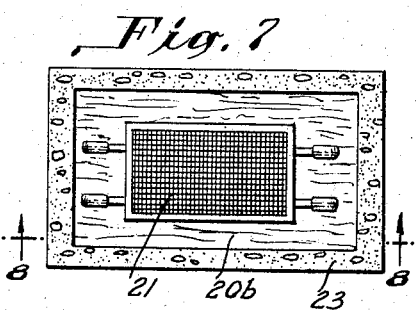
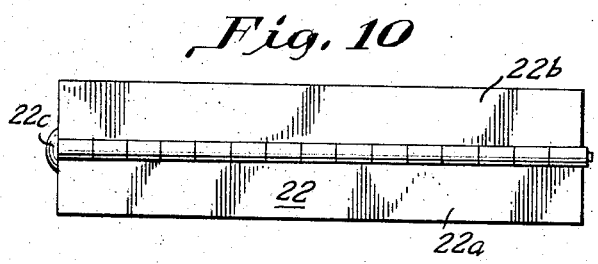
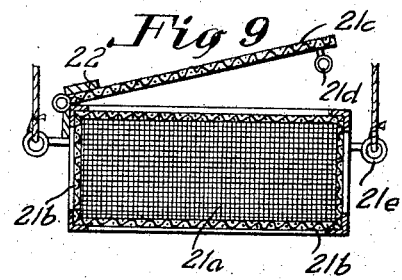
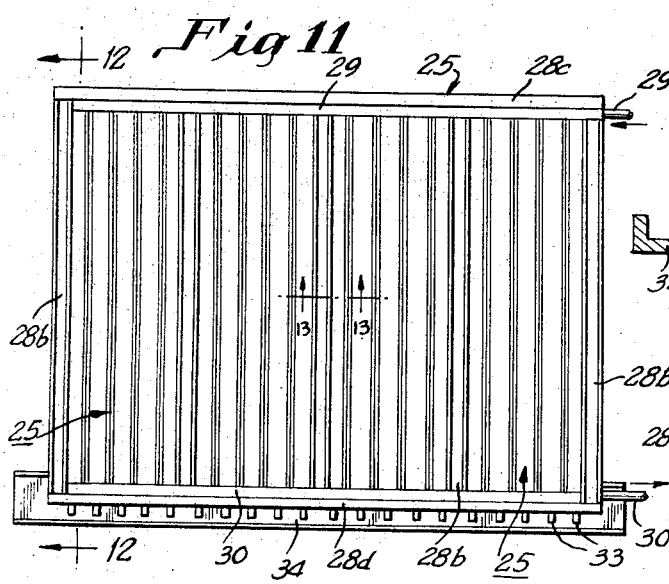
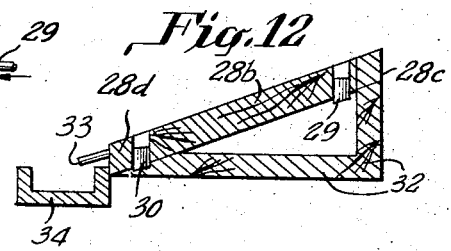
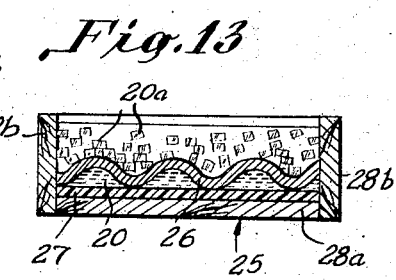
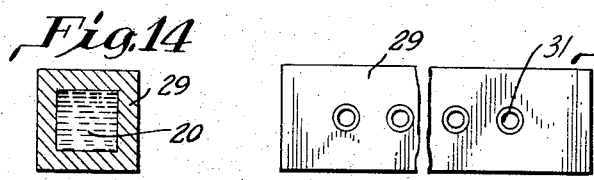
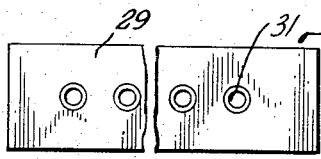
INVENTOR
Richard J. Rowekamp

United States Patent Office 3,349,573
Patented Oct. 31, 1967

3,349,573
SOLAR FREEZING METHOD FOR DESALT-
ING SEA WATER
Richard J. Rowekamp, 440 Hilltop Lane,
Cincinnati, Ohio 45215
Filed Oct. 23, 1965, Ser. No. 503,723
6 Claims. (Cl. 62—123)

ABSTRACT OF THE DISCLOSURE

This invention relates to a method and apparatus for desalting ocean water. The basic object is to provide a practical way to mass-produce ice crystals, through freezing, by exposing shallow trays of saline water to the extreme cold air of the atmosphere, preferably in a frigid region of the world—by attaching the trays to continuous moveable cables, which transport the half-frozen contents of the trays, periodically, to a central ice collection station, where the brine solution is separated from the fresh-water ice crystals. Also provided are ways to handle, collect, transport, wash, and melt the ice crystals.

---

The object of this invention is to improve the method for desalting sea water as described in my applications Ser. Nos. 431,509 and 442,920.

More particularly, this invention relates to an improved method for handling, collecting, transporting, washing, and melting the ice crystals which are formed when sea water is exposed in shallow trays to the extreme cold air of the atmosphere. Although this new concept deals more broadly and realistically with the problems of mass-producing fresh water from ocean water, it still employs the basic principle outlined in the aforementioned applications: by exposing salt water in shallow trays to the extreme cold air of the atmosphere, there are quick heat losses from the saline solution, and ice crystals are formed very rapidly; the ice crystals are pure water.

An object of this invention is to provide a means of suspending a large number of shallow corrosion-resistant metal trays, one above the other, so that perhaps as many as several thousand are held in the air between two supporting structures. This is accomplished by building two tall reinforced concrete structures, spaced considerably apart from one another, and which have running between them a series of long moveable wire cables held between pulleys which are anchored to the reinforced concrete structures. The long wire cables are drawn tightly between the pulleys, which in turn are connected to a motor, which provides a means of moving the cables. The shallow metal trays are welded to the long wire cables, and therefore it is possible to move the trays back and forth between the supporting structures, disposing of ice crystals, and taking on new batches of ocean water to be desalted.

Another object of this invention is to provide a means of collecting the ice crystals at a central station where it is more convenient to dispose of them. This is accomplished by building the central ice collection station as a part of one of the supporting structures; more specifically, at the base of one of the structures in the form of a chute, which is designed to momentarily hold the ice crystals while the brine solution drains away; then permitting the ice crystals to fall by gravity onto a conveyor or some other type of moving vehicle which will transport the ice crystals to the nearest storage area or to the next processing station.

Still another object of this invention is to provide a means of washing the ice crystals so that the salt solution, adhering to them, can be removed. This is accomplished very cheaply and easily, merely by placing the ice crystals into an aluminum screen basket and dunking them into a tank containing fresh water made by a previous operation.

Still another object of this invention is to provide a means of melting the ice crystals so that the fresh water can be pumped to a nearby city or farming region. This is accomplished through a heat-exchange operation whereby relatively warm sea water is run through the bottom enclosed portion of corrugated sheet aluminum, and the ice crystals are placed upon the upper portion of the corrugated sheet aluminum. Since "heat flows from hot to cold," the warmer sea water will heat the ice crystals, and cause them to melt.

The above and other objects and features of this invention will be apparent to those skilled in the art to which this invention pertains from the following detailed description, and the drawings, in which:

FIG. 7 is a schematic view showing an aluminum screen basket that is used to dunk ice crystals into a tank of pure water in order to wash away the salt solution adhering to them;

FIG. 8 is an enlarged view in section giving more details about the construction of the washing equipment, taken on the line 8—8 in FIG. 7;

FIG. 9 is an enlarged view in section giving more details of the construction of the aluminum screen basket shown in FIGS. 7 and 8;

FIG. 10 is an enlarged schematic view of a continuous-aluminum hinge that is used to secure a lid on the aluminum screen basket as shown in FIG. 9;

FIG. 11 is a schematic view showing a corrugated sheet aluminum heat-exchanger that is used to melt the ice crystals;

FIG. 12 is a view in side elevation of the heat-exchanger taken on line 12—12 in FIG. 11;

FIG. 13 is a view in section of the heat-exchanger taken on the line 13—13 in FIG. 11, giving details of its construction;

FIG. 14 is a view in section showing the construction of a square pipe used to feed and drain sea water through the heat-exchanger that is shown in FIG. 11;

FIG. 15 is another view in side elevation of the square pipe shown in FIG. 14, and giving the location of holes drilled into it to permit passage of water through it.

In the following detailed description and the drawings, like reference characters indicate like parts.

Figure 1:
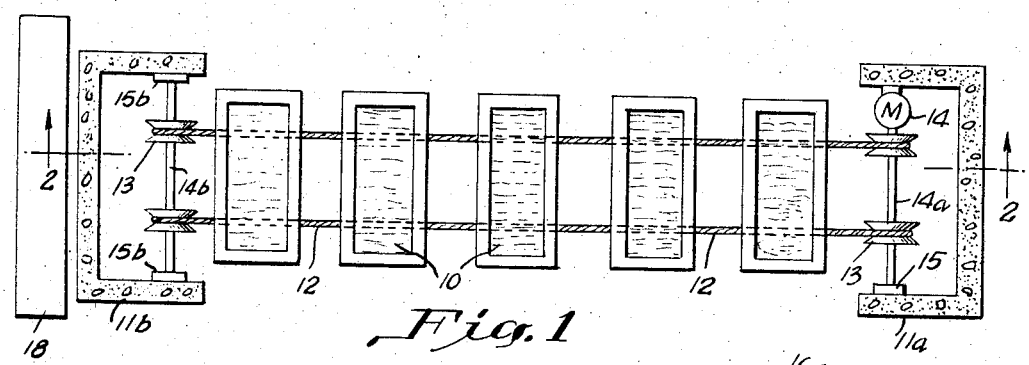
FIG. 1 is a schematic view showing an arrangement of trays and related components constructed in accordance with an embodiment of this invention.
Figure 2:
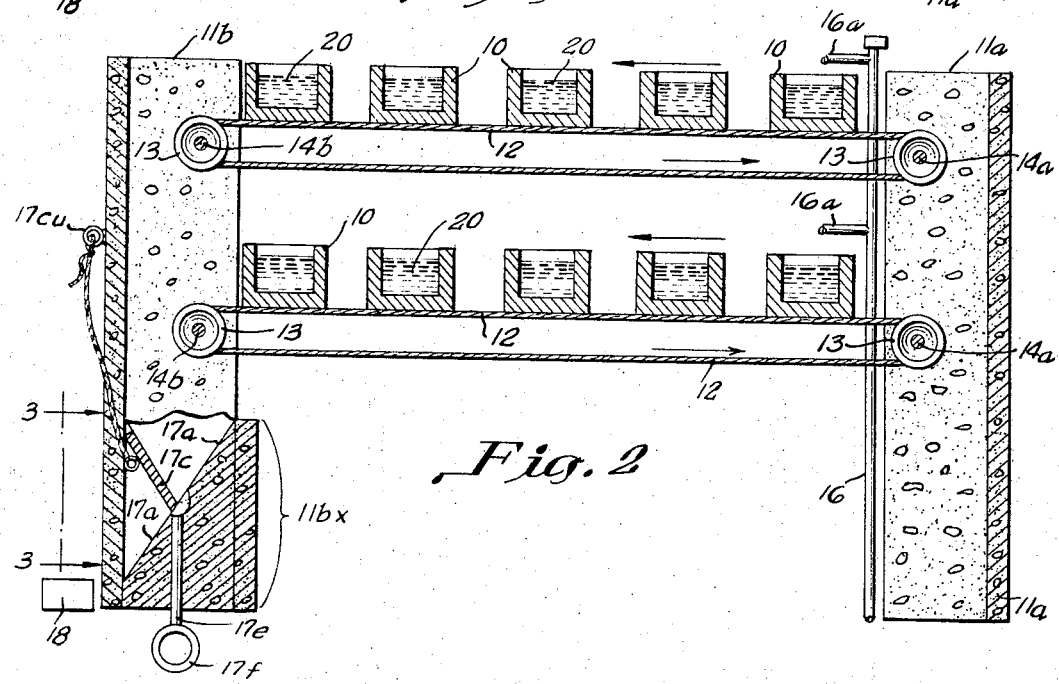
FIG. 2 is an enlarged view in section showing how the trays are suspended in the air, taken on the line 2—2 in FIG. 1.
Figures 3, 4, 5, 6:
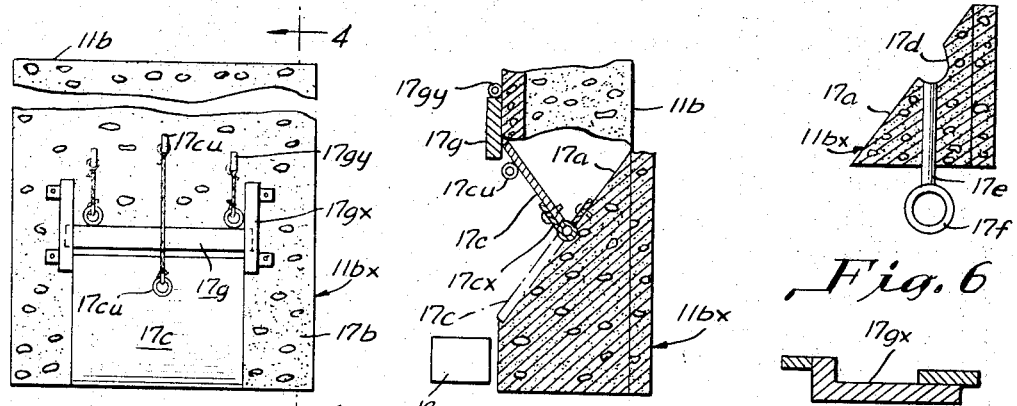
FIG. 3 is a view in side elevation showing a combination door-chute which is an important part of the central ice collection station that is an integral component of one of the supporting structures, taken on the line 3—3 in FIG. 2.
FIG. 4 is an enlarged view in section showing the construction of the central ice collection station, together with related components, taken on the line 4—4 in FIG. 3.
FIG. 5 is an enlarged view in section of a metal guide, which is one of the components of the central ice collection station shown in FIG. 3.
FIG. 6 is a more detailed view in section, showing the construction of a groove formed horizontally in the reinforced concrete comprising a part of the central ice collection station, and corresponding generally to the view shown in FIGS. 2 and 4.

In FIGS. 1 and 2 is shown how a group of shallow trays 10 are suspended in the air, one above the other, between two tall reinforced concrete supporting structures 11a and 11b by means of wire cables 12 which are held between pulleys 13 that are anchored to the reinforced concrete structures 11a and 11b. Wire cables 12 and pulleys 13 are arranged in pairs, up and down the supporting structures 11a and 11b, and each row of trays 10 is welded to a separate pair of wire cables 12; likewise, each pair of cables 12 are drawn tightly between a pair of pulleys 13 anchored in supporting structure 11a and another pair of pulleys 13 anchored in supporting structure 11b. Each tray 10 is welded to a pair of cables 12, and spaced apart from all neighboring trays 10 so that it is completely surrounded on the top, bottom, and sides by the cold air of the atmosphere. Likewise, in each row of trays, the trays 10 are so arranged so that they extend completely across the upper portion of the pair of cables 12, while there are no trays 10 on the bottom portion; or, in other words, the skyward portion of the cables 12 contain trays 10, while there are no trays 10 one the landward portion. Although only two rows of trays 10 are shown in the drawings (FIG. 2), it is intended that, under field conditions, as many as twenty or fifty rows would be suspended in the air between supporting structures 11a and 11b. In addition, in each row, there might be as many as one hundred to two hundred trays.

To provide a means of moving the trays 10 so that they can be emptied of ice crystals and take on new batches of ocean water 20, an electric motor 14 is mounted at an appropriate location on supporting structure 11a opposite each row of trays. Motor 14 is provided with a long shaft 14a, which runs between the motor 14 and the opposite wall of supporting structure 11a; two pulleys 13 are mounted on each shaft 14a, and the end of each shaft is mounted in a ball bearing housing 15 that is anchored to supporting structure 11a, as shown in FIG. 1. To two similar walls of supporting structure 11b, two ball bearing housings 15b are also anchored, and between them is run a long shaft 14b upon which are mounted two pulleys 13. A pair of cables 12 is fastened to each pair of pulleys 13 that is located in supporting structure 11a and to the opposite pair of pulleys 13 located in supporting structure 11b. All cables 12 are held tightly between pulleys 13, and run as near to level as possible so that all trays 10 will be suspended in the air in a nearly level position.

Supporting structure 11a acts chiefly as a means of suspending the trays 10 high in the air, one above the other; however, it also serves as a means of mounting motors 14 so that the trays 10 can be moved; in addition, it also serves as a means of anchoring a long inlet pipe 16, off of which there extends, at an appropriate location, a long flexible hose 16a, which delivers sea water 20 to each tray 10 as it moves past it after discharging a batch of ice crystals.

Supporting structure 11b also acts as a means of suspending the trays 10 high in the air, one above the other; however, in addition, it also serves as a central ice collection station 11bx. Central ice collection station 11bx is built as an integral part of reinforced concrete supporting structure 11b, and, in fact, a good part of it is made of reinforced concrete; furthermore, it forms the base of supporting structure 11b, and is a means of separating the ice crystals from the brine solution.

FIGS. 3, 4, 5, and 6 show details of the construction of central ice collection station 11bx, as is also shown partially in FIG. 2. The reinforced concrete portion consists of a downwardly slanting chute 17a and columns 17b. The chute 17a, together with moveable steel door 17c, collect the ice crystals when they first tumble downward from the trays 10, and temporarily hold them while the brine solution drains away along groove 17d, then through outlet pipe 17e, and finally through outlet header 17f. Concrete columns 17b support the entire portion of supporting structure 11b that is directly above them. After the brine solution has drained away, a steel stop 17g is pulled upward, thereby releasing moveable steel door 17c, which falls down upon the lower portion of concrete chute 17a, and the ice crystals are discharged from the central ice collection station 11bx into a conveyor 18, or the like, which moves the ice crystals to the next processing station. Moveable steel door 17c is anchored to concrete chute 17a by means of a steel hinge 17cx, which allows it to swing up or down; moveable steel door 17c also has a steel ring 17cu welded to it, and a second steel ring 17cu anchored nearby to the concrete supporting structure 11b, and this affords a means of raising the door back to a closed position after the ice crystals have been discharged, by pulling it upward with a rope. The steel stop 17g, which holds moveable steel door 17c in an up-position while the ice crystals and brine solution are tumbling downward from the trays 10, is held in place by a pair of steel guides 17gx (FIG. 5) which prevent it from falling out of position or from being pulled upward out of position; at the top and bottom of steel guide 17gx, there is a small piece of metal welded to the inside which keeps the guide from going out of position; and on the outside there are two small flanges which provide a means of anchoring it to reinforced concrete supporting structure 11bx; the steel stop 17g has one pair of steel rings 17gy welded to the uppermost part, and another pair anchored to supporting structure 11b, and, with a rope attached to the rings 17gy, this affords a means of raising steel stop 17g, thus releasing moveable steel door 17c at the desired intervals.

FIGS. 7, 8, 9, and 10 show equipment used for washing ice crystals 20a to remove brine solution adhering to them. After ice crystals 20a are dumped from central ice collection station 11bx onto conveyor 18, they are carried to the washing station; here they are put into a group of aluminum screen baskets 21, and then dunked into a large concrete tank 23 containing fresh water 20b made by a previous operation. The aluminum screen baskets 21 are comprised of a bottom screen panel and four side screen panels, which consist of a rather heavy gage aluminum wire screen 21a meshed together to a series of extruded aluminum angle bars 21b that are welded to each other at their junction; the basket 21 also consists of a top screen panel 21c, which is similar in construction to the other panels of the basket except that it is moveable, having a continuous aluminum hinge 22 welded to one of its ends and to one of the side wall panels; at the open end of top panel 21c there is a turnable ring 21d which fits into a slot cut into the aluminum angle bar 21b adjoining it, thus offering a means of locking the basket 21 when the ring 21d is turned. Near the top four corners of basket 21, rings 21e are welded, to which a rope or the like is tied so that the basket 21 can be lifted into the air and dunked into the tank 23. In FIG. 10 is shown continuous hinge 22; it consists of a right-half 22a and a left-half 22b, together with a long pin 22c which fits through the abutting holes of the two sides of the hinge 22. Concrete tank 23 is comprised of a base and side walls extending upwardly from the base; the upper portion is uncovered; it is filled with fresh water 20b by means of an inlet pipe 23a, and drained of brackish water by means of an outlet pipe 23b (FIG. 8). The fresh water 20b is put into tank 23 at a temperature of about 32° F. so that it will melt very little of the ice crystals 20a; the basket 21 containing the ice crystals 20a is dunked into the fresh water 20b once or twice so that the brine solution adhering to the ice crystals will be washed away. This is a very cheap and easy way to wash the ice crystals, because little mechanical equipment is involved; it can be accomplished in the manner described because the ice crystals which result from solar freezing are relatively large, and can be contained within a wire screen basket. After a considerable number of baskets of ice crystals have been washed, a brackish solution is formed in the tank 23, and this brackish solution must be drained through outlet pipe 23b and fresh water 20b pumped into tank 23 through inlet pipe 23a.

FIGS. 11 thru 15 show equipment used to melt the ice crystals 20a so that fresh water can be pumped to a nearby city or farming region. The general scheme is to take sea water 20 from the ocean or a bay at about 50° F., and to use this 50° F. sea water 20 in a heat exchange operation to melt ice crystals 20a. It is believed that it is possible to obtain ocean water at 50° F. at a solar freezing site during winter, because there are currents which run through the oceans which carry water all the way from the Equator to northern lands, and because large bodies of water have slow heat losses. It is also part of the general scheme to pump the chilled ocean water 20 made in the heat exchange operation up into the trays 10 because it will be at a lower temperature and because it will freeze much quicker. The 50° F. water will melt the ice crystals 20a because, as explained by the Second Law of Thermodynamics: heat flows from hot to cold; therefore, the ice crystals will be melted by the relatively warmer ocean water.

The heat exchanger 25 (FIG. 11) is comprised of a number of sections 25, which, when assembled together, make up a large heat exchanger 25. A heat exchanger section 25 (FIG. 13) is comprised of a piece of corrugated sheet aluminum 26, which rests upon a block of insulating material 27, such as polyurethane resin; both the insulation 27 and the corrugated sheet aluminum 26 are contained within a supporting structure comprised of a wood base support 28a, wood side supports 28b (FIG. 13), and wood end supports 28c and 28d (FIG. 11). The wood side supports 28b and end supports 28c and 28d extend about one inch higher than the ridges of corrugated sheet aluminum 26, thus providing a means of containing ice crystals 20a on top of the corrugated sheet aluminum 26. Below the corrugated sheet aluminum 26, between the raised corrugations and the insulation 27, runs relatively warm sea water 20. Since the polyurethane resin insulating material 27 is water-tight, it is used to contain the sea water between itself and the corrugated sheet aluminum 26, and in addition it throws all the heat of the sea water 20 upward to the ice crystals 20a which rest on top of corrugated sheet aluminum 26. Sea water 20 is fed into the heat exchanger 25 by means of a square inlet pipe 29, and drained out by means of a square outlet pipe 30; both inlet pipe 29 and outlet pipe 30 are constructed in the same manner, and, at the appropriate location in each, a hole 31 is drilled so that sea water 20 will flow through them and through the corrugations. As a means of draining away the fresh water 20b resulting from the melting ice crystals 20a, the heat exchanger 25 is raised upon a wood frame 32 so that square aluminum inlet pipe 29 is about one foot higher than square aluminum outlet pipe 30; through this arrangement, both the fresh water 20b and the salt water 20 will drain from the heat exchanger 25; to provide drainage of fresh water 20b, it is necessary to drill holes through wood end support 28d at the appropriate locations, and insert therein an outlet pipe 33 which will allow the fresh water 20b to drip into a gutter 34, which will direct the fresh water to a suitable storage reservoir.

All aluminum items specified herein—the trays 10, basket 21, corrugated sheet aluminum 26, and square inlet and outlet pipes 29 and 30—will be formed of aluminum alloyed with titanium to make them corrosion-resistant. The trays 10 are comprised of a bottom panel and side walls extending upwardly from the bottom panel; the upper portion is uncovered; the maximum depth of the trays 10 is about two inches, and they will hold about one gallon of salt water per each square foot of area exposed to cold air. The wire cables 12 and pulleys 13 can also be made of aluminum alloyed with titanium, but they could be made of any other suitably strong, corrosion-resistant material. The moveable steel door 17c, the steel stop 17g, and the steel guide 17gx can be made of low-carbon steel alloyed with chromium, or any other suitably strong and corrosion-resistant steel.

It is a further object of this invention to point out that the design of the equipment outlined herein could be altered slightly without departing from the spirit and scope of the appended claims.

Having described my invention, what I claim as new and desire to secure by Letters Patent, is:

1. A method for converting ocean water into freshwater ice crystals, through freezing, requiring no fuels, no refrigerants, nor any mechanical freezing techniques, and comprising, in combination, suspending a series of shallow containers high in the air one above the other, filling said containers with saline water, exposing said containers to the extreme cold air of the atmosphere until the contents are approximately half frozen, periodically moving said containers in an endless path to a discharge zone and thence to a filling zone so said containers can be successively emptied and refilled, allowing the brine solution to drain away from the ice crystals in said discharge zone, gathering said ice crystals and transporting them to a washing station, and dunking said ice crystals into a pool of fresh water which washes away the brine solution adhering to them.

2. A method for making, washing, and melting ice crystals comprising, in combination, exposing to the cold air of the atmosphere shallow containers that have been suspended high in the air one above the other, filling said containers with ocean water, periodically moving said containers after the saline solution has been half frozen, dumping the ice-brine solution into a central ice collection station, momentarily holding the ice crystals in a stationary position while the brine solution drains away, collecting said ice crystals leaving said central ice collection station and conveying them to a washing station, dunking said ice crystals into a pool of fresh water which washes away the brine adhering to them, melting said ice crystals through a heat exchange operation whereby the ice crystals are held upon the upper portion of a thin gage metal and placed in relatively close contact with comparatively warm ocean water immediately below said thin gage metal, collecting fresh water after the ice crystals have been melted by said heat exchange operation, and repeatedly moving said containers through an endless path to accomplish the above cycles relating to freezing saline water and separating ice crystals from the brine solution.

3. A solar freezing apparatus for desalting sea water through exposure to the extreme cold air of the atmosphere, which comprises rows of shallow trays hung, one above the other, so that each tray is completely surrounded by the cold air of the atmosphere; said trays being comprised of a base and walls extending upwardly from said base, and having an upper portion that is uncovered; means for suspending said trays high in the air upon moveable cables; means for collecting the ice crystals from all the trays and draining away the brine solution at a central collection station; means for dumping the ice crystals onto a moving conveyor which will transport them to a suitable storage area, and means for filling each of said trays with sea water.

4. A solar freezing apparatus for desalting sea water through exposure to the extreme cold air of the atmosphere, which comprises rows of shallow uncovered corrosion-resistant metal trays, hung, one above the other, so that each tray is completely surrounded by the cold air of the atmosphere; said metal comprising said trays being aluminum alloyed with titanium; means for filling said trays with sea water; means for suspending said trays high in the air upon moveable cables; said suspending means comprising a combination of tall supporting structures between which are pulley-driven cables; means for collecting the ice crystals from all the trays and draining away the brine solution at a central collection station; means for transporting said ice crystals away from said central ice collection station; means for dunking said ice crystals into fresh water to wash away the brine solution adhering to them; and means for melting said ice crystals through a heat exchange operation comprising a method for placing relatively warm sea water in close contact with a shallow layer of ice crystals by separating the two with a thin gage metal.

5. A solar freezing apparatus for desalting sea water through exposure to the extreme cold air of the atmosphere, which comprises rows of shallow uncovered metal trays, hung one above the other, so that each tray is completely surrounded by the cold air of the atmosphere; said metal trays being made from aluminum alloyed with titanium; means for filling said trays with sea water; means for suspending said trays between two tall reinforced concrete structures which have a series of long moveable wire cables running between them; said cables attached to a pair of pulleys anchored to each of said reinforced concrete structures; one of said reinforced concrete structures having electric motors mounted upon it which drive said pulleys; the second of said reinforced concrete structures having a central ice collection station built into its base; said central ice collection station designed to momentarily hold the ice crystals after they are dumped out of the moveable trays so that the brine solution will drain away; means for dumping the ice crystals out of the central ice collection station onto a moving vehicle which will transport the ice crystals to a washing station; means for dunking a wire screen basket containing ice crystals into a tank filled with fresh water so that the brine solution adhering to the ice crystals will be washed away; means for melting the ice crystals through the use of a heat exchanger which exposes the ice crystals to relatively warm sea water; said heat exchanger comprised of insulated corrugated sheet aluminum which carries the ice crystals on top and the sea water below between its corrugations and the water-tight insulation; means for introducing sea water into said heat exchanger; means for discharging sea water from said heat exchanger; and means for collecting the fresh water after the ice crystals are melted by the heat exchanger.

6. A solar freezing apparatus for desalting sea water through exposure to the extreme cold air of the atmosphere, which comprises rows of shallow uncovered corrosion-resistant metal trays, hung one above the other, and spaced apart from each other, so that each tray is completely surrounded by the cold air of the atmosphere; means for filling said trays with sea water; means for emptying ice crystals and brine solution from the trays; said means for emptying said ice crystals and said brine solution from said trays being a pair of continuous and moveable wire cables mounted between two pairs of pulleys and arranged so that the trays will dump out their contents when they move from the upper side of the cables to the underside of the cables as they are moved by the pulleys; means for suspending said trays between two tall reinforced concrete structures; one of said reinforced concrete structures being designed both to support and move the cables which carry the trays; the second of said reinforced concrete structures being designed both to support the cables which carry the trays and also to collect the ice crystals when they are dumped out of the trays; said design of second reinforced concrete structure being such that the base comprises a downwardly slanting chute with a column on each side of the chute; said chute having a groove formed into it that drains away the brine solution, and also having a hinged steel door mounted upon it which temporarily holds the ice crystals in the chute; said hinged steel door held in an up-position by means of a moveable steel stop anchored on the second reinforced concrete structure; means for collecting the ice crystals upon a moving conveyor when they are dumped from said chute; means for washing the ice crystals; the means for washing said ice crystals being a portable aluminum screen basket which dunks them into a concrete tank containing fresh water which washes away the brine solution adhering to them; means for melting the ice crystals through the use of a heat exchanger which exposes the ice crystals to relatively warm sea water; said heat exchanger comprised of sections of corrugated sheet aluminum resting upon a waterproof insulation board and supported by wood planks, the sides and end walls of which serve to hold the ice crystals on top of the corrugated sheet aluminum; means for introducing sea water into the heat exchanger so that the sea water will flow between the corrugation in the sheet aluminum and the waterproof insulation board; means for draining said sea water from said heat exchanger; and means for collecting the fresh water after the ice crystals are melted by the heat exchanger.

References Cited
UNITED STATES PATENTS

| 1,495,848 | 5/1924 | Hexamer | 62—123 X |
| 3,170,779 | 2/1965 | Karnofsky | 62—123 X |

LLOYD L. KING, *Primary Examiner.*

ROBERT A. O'LEARY, *Examiner.*

W. E. WAYNER, *Assistant Examiner.*